(12) United States Patent
Wathey

(10) Patent No.: US 11,507,081 B2
(45) Date of Patent: Nov. 22, 2022

(54) FLIGHT STICK COCKPIT SIMULATOR GROUND STATION SYSTEMS

(71) Applicant: Chad Wathey, Cole Bay (SX)

(72) Inventor: Chad Wathey, Cole Bay (SX)

( * ) Notice: Subject to any disclaimer, the term of this patent is extended or adjusted under 35 U.S.C. 154(b) by 0 days.

(21) Appl. No.: 17/227,823

(22) Filed: Apr. 12, 2021

(65) Prior Publication Data

US 2022/0244722 A1     Aug. 4, 2022

Related U.S. Application Data

(60) Provisional application No. 63/010,215, filed on Apr. 15, 2020.

(51) Int. Cl.
*B64C 19/00* (2006.01)
*G09B 9/48* (2006.01)
*G05D 1/00* (2006.01)

(52) U.S. Cl.
CPC ............ *G05D 1/0016* (2013.01); *B64C 19/00* (2013.01); *G09B 9/48* (2013.01)

(58) Field of Classification Search
CPC ...... G05D 1/0016; B64C 19/00; B64C 13/12; G09B 9/48
See application file for complete search history.

(56) References Cited

U.S. PATENT DOCUMENTS

| | | | | |
|---|---|---|---|---|
| 4,386,914 A | * | 6/1983 | Dustman | G09B 9/305 446/7 |
| 5,129,826 A | * | 7/1992 | Munsch | G09B 9/48 434/33 |
| 5,431,569 A | * | 7/1995 | Simpkins | G09B 9/02 434/59 |
| 5,878,981 A | | 3/1999 | Dewey | |
| 6,331,114 B1 | * | 12/2001 | Massey | G09B 9/28 434/30 |
| 8,740,665 B1 | | 6/2014 | Bowers | |
| 9,522,726 B1 | | 12/2016 | Bowers | |

* cited by examiner

*Primary Examiner* — Brian M O'Hara

(57) ABSTRACT

A flight stick cockpit simulator ground station system is provided. The system includes a base. The system also includes a yoke control module connected to the base. Further, the system includes a yaw control module connected to the base. Additionally, the system includes a throttle control module connected to the base. The system also includes a manipulator module for an aerial TUC transmitter for remote controlled aircraft connected to the base and configured to receive inputs from the yoke control module, the yaw control module, and the throttle control module and structured to mechanically control the aerial R/C transmitter without the need for electrical or computerized mechanisms.

13 Claims, 8 Drawing Sheets

FLIGHT STICK COCKPIT SIMULATOR GROUND STATION SYSTEMS

CROSS-REFERENCE TO RELATED APPLICATIONS

This application claims priority to provisional application 63/010,215 filed on Apr. 15, 2020 and is incorporated herein by reference in its entirety.

FIELD OF THE INVENTION

The present invention relates to aircraft remote control systems, and particularly to flight stick cockpit simulator ground station systems for providing users of remote-controlled aircraft, operational emulation of cockpit control interfaces configured to interact with a remote controller to pilot the aircraft.

BACKGROUND OF THE INVENTION

Previous attempts to create systems to emulate cockpit control interfaces have been complex and unsuccessful for budget purposes and operational ease of use. In many instances, a variety of these systems require computer interfaces between an operator and an aircraft simulator without any physical or mechanical interface with a remote controller.

Further, many previous attempts require a multitude of costly computerized interfaces and render these systems too expensive for common market uses.

The nature of piloting a remote-controlled aircraft requires a user to manipulate physical components on a remote-control transmitter to direct the aircraft's flight. As the world's remote-controlled aircraft operators and gaming population has increased, so has the need for alternative platforms to control remote-controlled aircraft.

Accordingly, there is an established need for remote-controlled aircraft operating platforms which solve at least one of the aforementioned problems. Further, there is an established need for flight stick cockpit simulator ground station systems, having various forms, that can provide an operational interface between a remote-controlled aircraft and a user.

SUMMARY OF THE INVENTION

According to an aspect of the present invention, a flight stick simulator ground station system is presented. The system includes a mechanical interface between cockpit operational control interfaces and a remote-control platform. The remote-control platform can include radio frequency controllers configured to operate remote-controlled aircraft.

In another aspect, a flight stick cockpit simulator ground station system is provided. The system includes a base. The system also includes a yoke control module connected to the base. Further, the system includes a yaw control module connected to the base. Additionally, the system includes a throttle control module connected to the base. The system also includes a manipulator module for an aerial R/C transmitter for remote controlled aircraft connected to the base and configured to receive inputs from the yoke control module, the yaw control module, and the throttle control module and structured to mechanically control the aerial R/C transmitter without the need for electrical or computerized mechanisms.

In an aspect, the system can include cockpit operational control interfaces emulating, but not limited to, helicopters, multi-rotor aircraft and/or fixed wing aircraft.

In another aspect, the system can also include adapters for various styles of aircraft cockpits.

In yet another aspect, the system can be configured to work with remote-controllers such as but not limited to Futaba®, Spektrum ®, FR Sky®, Radiolink®, Flysky®, and/or Jumper®.

In an embodiment, the system can include an operator seating surface. The seating surface configured to provide the operator access to cockpit operational control interfaces similar to those found onboard an aircraft.

In another embodiment, the system can also include throttle controls and a yoke stick.

In yet another embodiment, the system can include goggles, the goggles configured to interface between one or a plurality of forward-looking cameras on an aircraft and the operator. The operator can utilize the goggles to navigate the aircraft.

In an aspect, the system can include further aircraft control interfaces emulating controls found onboard an aircraft.

In another aspect, the system can also include rudder controls.

In yet another aspect, the system can include a collapsible seating surface, and/or a collapsible stick control, and/or collapsible throttle control, configured to provide portability of the remote-control operator platform allowing ease of transporting embodiments of the system in a commercial aircraft and/or automobile.

In an embodiment, the system can include arm and/or disarm motor controls.

In another embodiment, the system can also include foldable system components structured to minimize a number of steps required to assemble and/or disassemble embodiments of the system.

In yet another embodiment, the system can include materials such as but not limited to aluminum, stainless steel, composites, carbon fiber, and/or synthetic plastics.

In an aspect, the system can include low friction coating surfaces such as but not limited to Teflon®, ceramics, synthetic plastics, and/or composites.

In embodiments, the system includes mechanical interfaces between cockpit operator controls and a remote controller, without computer and/or software interface. Embodiments of the system provide protection against computer and/or software malfunction for operating the system. Further, embodiments of the system provide physical and/or mechanical interfaces configured for reliability and to provide for redundancy. In embodiments, the system can include all metal construction of the main support frame structure and most of the input components. All metal construction can reduce system response time by allowing a tighter, more accurate, more precise and more sensitive control of the RC controller.

In embodiments, the system can include enhanced cable fastening support design configured with a plurality of materials such as but not limited to synthetic or organic cellulose fiber, plastics, carbon, Delrin, and metal wire or cabling.

In embodiments, the system can include adjustable sliding yoke and rudder pedal design.

In embodiments, the system can include a rigid transmitter box clamping mechanism.

In embodiments, the system can include a yaw control module which functions to control yaw with a see-saw configuration allowing a user of the system to provide resistance in controlling the yaw by leg resistance of opposing right and left foot pedals without the need for springs, dashpots, or computer assisted interface.

In embodiments, the system can include structural components of the system which are constructed of metal.

In embodiments, the system can include system components which are collapsible and are configured to be placed within a travel container and designed to allow portability of the system in common commercial aircraft and a car.

In embodiments, the system can be configured to interface with a plurality of system user seating surfaces.

In embodiments, the system can include a manipulator module for an aerial R/C transmitter which is adjustable and configured to connect with a plurality of different shapes and models of aerial R/C transmitters.

In embodiments, the system can include a manipulator module for an aerial R/C transmitter which can be configured to connect to and manipulate left and right-hand control interfaces of the aerial R/C transmitter.

In embodiments, the system can include a mechanical interface for the aerial R/C transmitter and can be configured to rigidly hold the aerial R/C transmitter in position.

In embodiments, the system can include a throttle control module, a yoke control module and a yaw control module which can be adjustable with respect to position on the system.

In embodiments, the system can include rigidly connected system control components and are configured to provide increased sensitivity, precision and enhanced system response to system user control movements.

In embodiments, the system can include adjustment points of the system which are uniform and configured to be adjusted utilizing a same tool.

In embodiments, the system can include a yaw control module which includes round pedals configured to roll under a system user's right and left feet.

In embodiments, the system can include a manipulator module which can be configured to operate auxiliary functions on the aerial R/C transmitter.

In embodiments, the system can include a manipulator module which includes a clamping mechanism wherein the clamping mechanism is adjusted to allow removal of the aerial R/C transmitter and to firmly secure the aerial R/C transmitter from and to the system.

In embodiments, the system can include components to provide far over travel range protection of primary transmitter inputs.

In embodiments, the system can include system structural components without plastic or other flexible material configured to reduce elasticity in system response.

In embodiments, the system can include mechanical control components which are rigidly connected thereby increasing system sensitivity and increasing system responses to the movements on the control platform.

In embodiments, the system can include removal of spring or dashpots in order to improve system response.

In embodiments, the system can include foot pedals which are operated as a "See-Saw" system in that opposing right and left legs provide system resistance to all control movements of the yaw control module.

In embodiments, the system can also include round pedals which roll under the operator's feet.

In embodiments, the system can include collapsible frame and control system designed to allow all system components to be "folded" unto itself thus being able to place all system components in a travel bag designed to comply with all airline regulations for checking in the bag for travel.

In embodiments, the system can include reinforced system structural connectors to allow users of the system to place all system components in the bag and allow for easy transport via airlines and to be able to "unfold" the system at another location and to be fully functional for use.

In embodiments, the system can be designed with minimization of system adjustment mechanisms and making all system setup adjustment mechanisms uniform to allow system users to adjust the system for use adaptable to different users with a minimum number of adjustment tools and adjustment points.

In embodiments, the system can be designed to be adapted or configured to various aircraft types, rotor wing or fixed wing.

In embodiments, the system can include a base wherein the base can be a frame support for modules or a platform support for modules.

In embodiments, the system can include an aerial remote-control (R/C) transmitter to control remote controlled aircraft.

In embodiments, the system can include a manipulator module, wherein the manipulator module provides a mechanical interface for the system to control an aerial R/C transmitter, In embodiments, the system can include a mechanical interface with an aerial R/C transmitter and can be configured to operate auxiliary functions such as but not limited to on/off switch, operating frequency changes, additional yaw control for additional components on a remote-controlled aircraft.

In embodiments, the system can include a clamping mechanism wherein the clamping mechanism can secure and release an aerial R/C transmitter.

In embodiments, the system can include a see-saw clamping mechanism designed to secure an aerial R/C transmitter onto the system.

In embodiments, the system can include a yoke control module. The yoke control module can include a yoke, yoke mechanical control features as found in actual aircraft, control cabling designed to connect with a manipulator module to provide input, mechanical swivel points configured to provide a system user with operational control of the yoke, and mechanical connection points with the base of the system.

In embodiments, the system can include a yaw control module. The yaw control module can include foot pedals, mechanical connections to the base, mechanical connections with a pivot arm, rounded foot pedals, control cabling to provide input to a manipulator module, unitary foot pedal configuration wherein each foot of a user operating the yaw control module provides resistance to the other foot in controlling yaw, and connection points with the base of the system.

In embodiments, the system can include a throttle control module. The throttle control module can include mechanical throttle controls as found onboard aircraft, control cabling designed to connect to the manipulator module to provide input, swivel connections with the base, and auxiliary controls emulating those found onboard aircraft In embodiments, the system can include a manipulator module. The manipulator module can include control cabling inputs from system modules designed to provide control features for the manipulator module to interface with an aerial R/C transmitter to provide mechanical operational control of the transmitter, mechanical adjustable connections to the base, mechanical interfaces with the transmitter to control auxiliary features of the aircraft, and a see-saw clamping mechanism.

In embodiments, the system can include stick manipulators. The stick manipulators can include an adjustable clamping mechanism. The adjustable clamping mechanism can include a clamp plate, a retainer screw or pin and nut, an adjustable pivot screws or pins, and a fastening screw and nut. When assembled this can create a robust clamping assembly via a see-saw like motion by tightening a nut on the fastening screw.

In embodiments, the system can include use as a simulator by linking an aerial R/C transmitter to a computer or a PC system by required cable.

In embodiments, the system can be linked and or connected to another system to emulate a dual flight control system as in most production aircraft.

In embodiments, the system can include a see-saw clamping mechanism. The clamping mechanism can include an alignment screw allowing alignment of the clamp plate with a clamping mechanism frame. The mechanism can also in include a clamp plate with an adjustment screw about a center of the clamp plate and the clamping mechanism frame.

The clamp plate adjustment screw can provide a pivot point about which the lamp plate can see-saw about upon adjustment of one of two clamping mechanism tightening or loosening adjustment screws. The see-saw feature allows firmly tightening of the clamp plate utilizing only one of the clamping tightening or loosening screws. Further, the clamping mechanism can include tightening and loosening screws aligned symmetrically or offset from one another. The offset feature allows see-saw movement of the clamp plate in two dimensions, horizontal and vertical. In embodiments, the see-saw feature can allow for see-saw movement of the clamp plate about the clamp plate adjustment screw both in an x-axis and y-axis.

These and other features and advantages will become apparent from the following detailed description of illustrative embodiments thereof, which is to be read in connection with the accompanying drawings.

BRIEF DESCRIPTION OF THE DRAWINGS

The features and advantages of the present invention will be better understood when the Detailed Description of the Preferred Embodiments given below is considered in conjunction with the figures provided.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

In an embodiment of the invention, the system is configured to provide direct mechanical connectivity between operator control interfaces and a remote controller of a remote-controlled aircraft.

Figure 1:
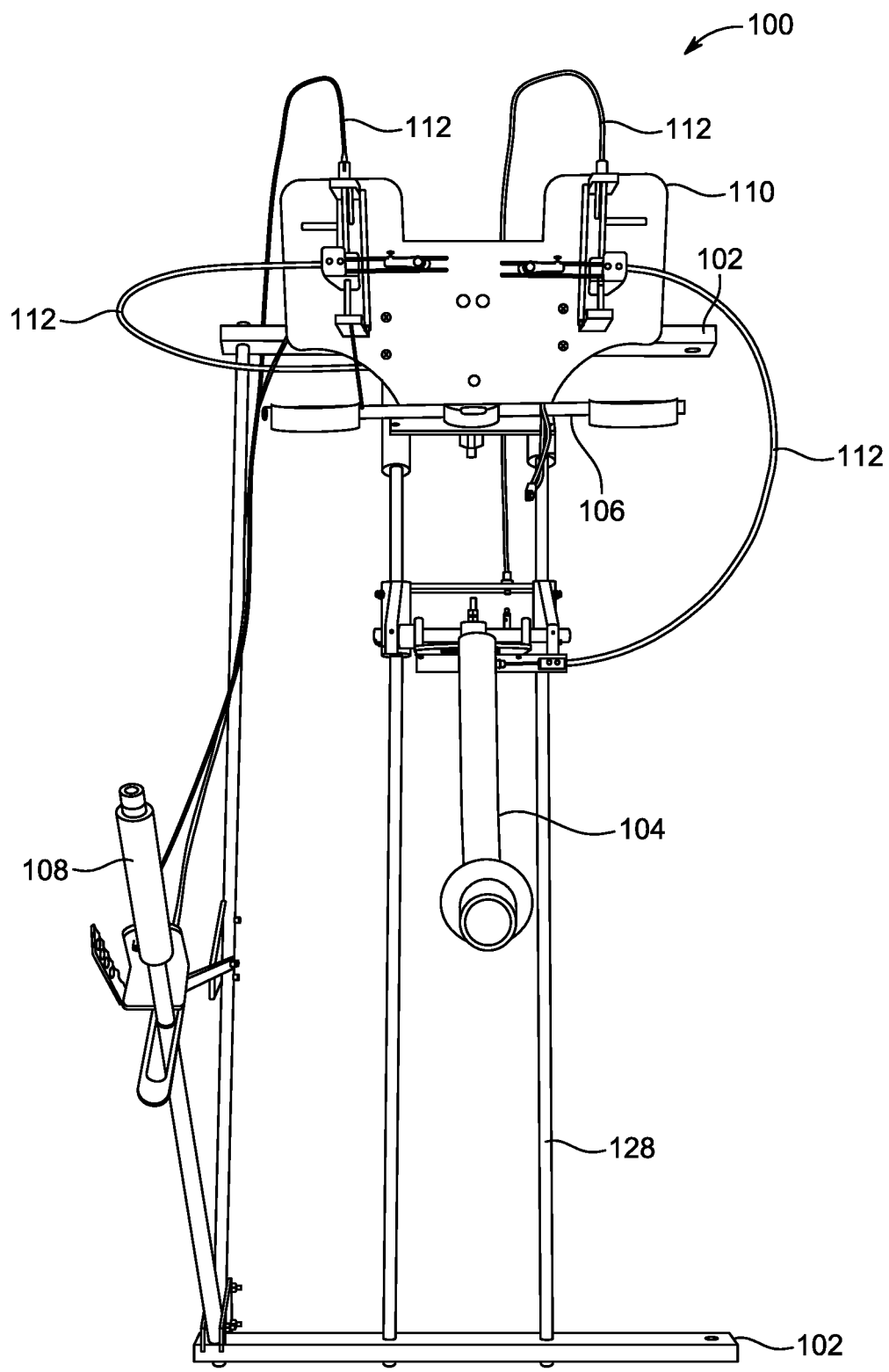
FIG. 1 is a top view of an embodiment of a flight stick cockpit simulator ground system.

As seen in FIG. 1, a top view of a flight stick cockpit simulator ground station system 100 is displayed. As displayed in FIG. 1, the system 100 can include a base 102. The system 100 also can also include a yoke control module 104 connected to the base 102. Further, the system 100 can also include a yaw control module 106 connected to the base 102. Additionally, the system 100 can include a throttle control module 108 connected to the base 102. Further still, the system 100 can include a manipulator module 110 connected to the base 102. The manipulator module 110 can connect with system modules, 104, 106, 108 with control cabling 112 and can be configured to mechanically operate an aerial R/C transmitter 114. As shown, the throttle control module 108 is positionable on the left-hand side of the system 100 and is adjustable on the base 102. At the connection point between the throttle control module 108 and the base 102 the connectors allow the throttle control module 108 to be collapsible.

The yoke control module 104 is positionable about the centerline of the system 100. Further the yoke control module 104 can be adjusted to move forward and back to accommodate different users. The yaw control is also adjustable and is positionable about the centerline of the system 100. The yaw control module 106 can be move forward and back also to accommodate different users. The yaw control module 106 can include foot pedals 116. The foot pedals 116 are rigidly connected and provide yaw control with a user's right and left feet.

As can be seen the manipulator module 110 can be positionable near the front of the system 100 and can include a clamping mechanism 118. The clamping mechanism 118 can be of a see-saw configuration. The clamping mechanism 118 can be adjustable and can be utilized to secure an aerial R/C transmitter 114 (not shown). Further, as shown, the modules 104, 106, 108 of the system 100 are configured to connect with cables 112 to provide input to the manipulator module 110 to operate an aerial R/C transmitter 114 (not shown).

Figure 2:
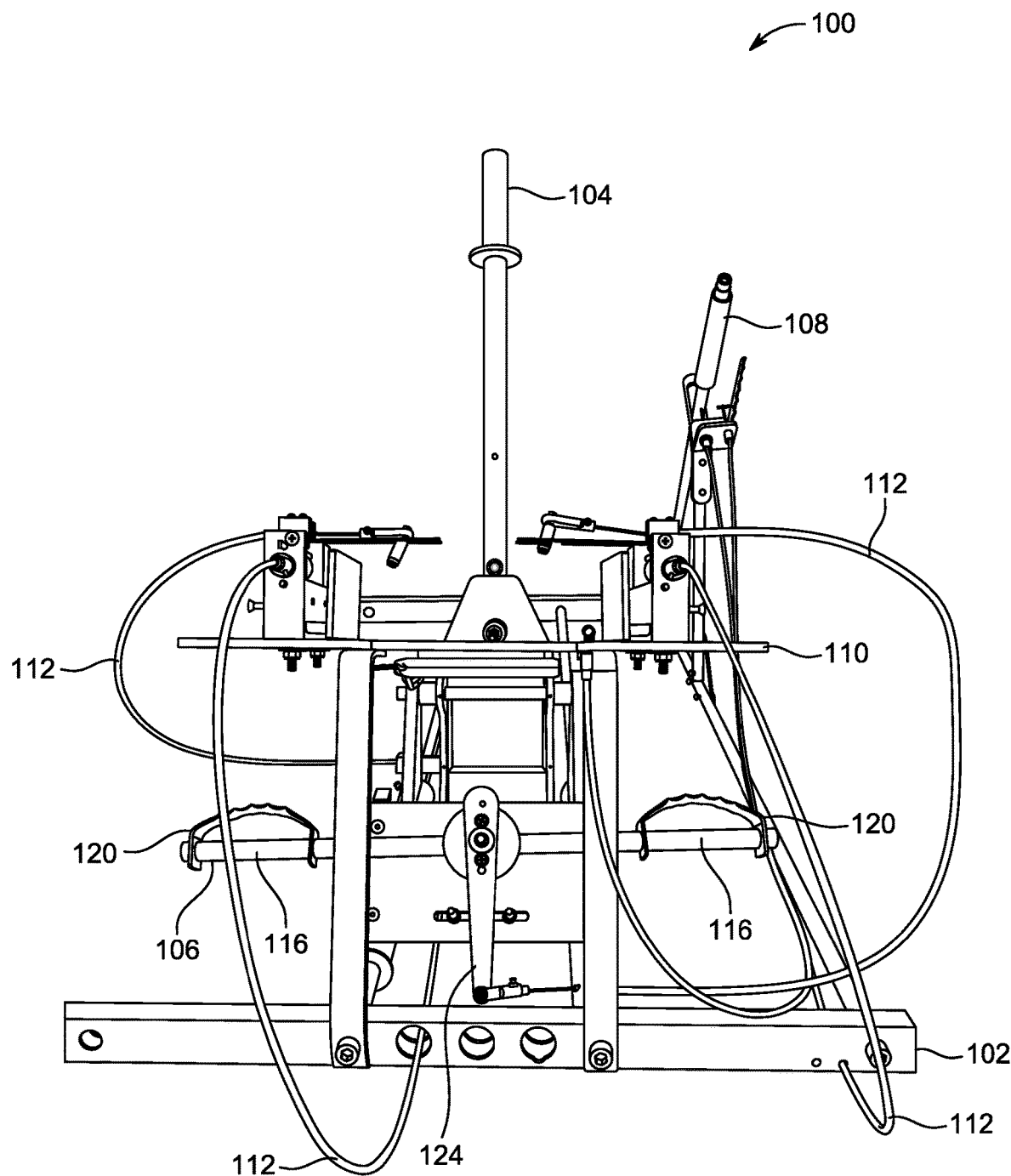
FIG. 2 is a front view of an embodiment of the present invention.

FIG. 2 shows a front side view of the system 100. As seen the yaw control module 106 can include foot pedals 116 for a user to control with their right and left feet. Further, the system 100 can also include round pedals 120 which roll under the operator's feet. These features allow a user to conduct operation of the yaw control module 106 in a precise and accurate fashion. Also, as shown in FIG. 2, the various modules 104, 106, 108 connect with control cables 112 designed to control the operation of the manipulator module 110. The manipulator module 110 can include mechanical interfaces 122 for the manipulator module 110 to operate a left hand and right-hand side of an aerial R/C transmitter 114 (not shown).

FIG. 2 is a front view of components of an embodiment of the system 100. The right and left foot pedals 116 controls are shown connected to a black carbon fiber pivot arm 124. The pivot arm 124 has an end which is connected to a control cable 112 which can be utilized to provide rudder controls in a helicopter and/or fixed wing cockpit control platform.

FIG. 2 illustrates a control cable 112 housing connecting to and through control blocks 126 and a control cable 112 connecting to a pivot arm 124 connected to a yoke stick control interface. In embodiments the yoke stick control provides left and right banking controls as well as up and down altitude controls, and/or pitch and roll controls.

In FIG. 2, an embodiment can include a center yoke stick control and a left-hand throttle control. Further, the system can include a manipulator module 110 as well as manipulating slide blocks 126 on left hand and right hand of a manipulator module 110. As can be seen on the bottom, an embodiment can include left- and right-hand foot pedal controls. Additionally, control cables 112 can connect cockpit controls to control interfaces 122 on an aerial R/C transmitter 114.

Figure 3:
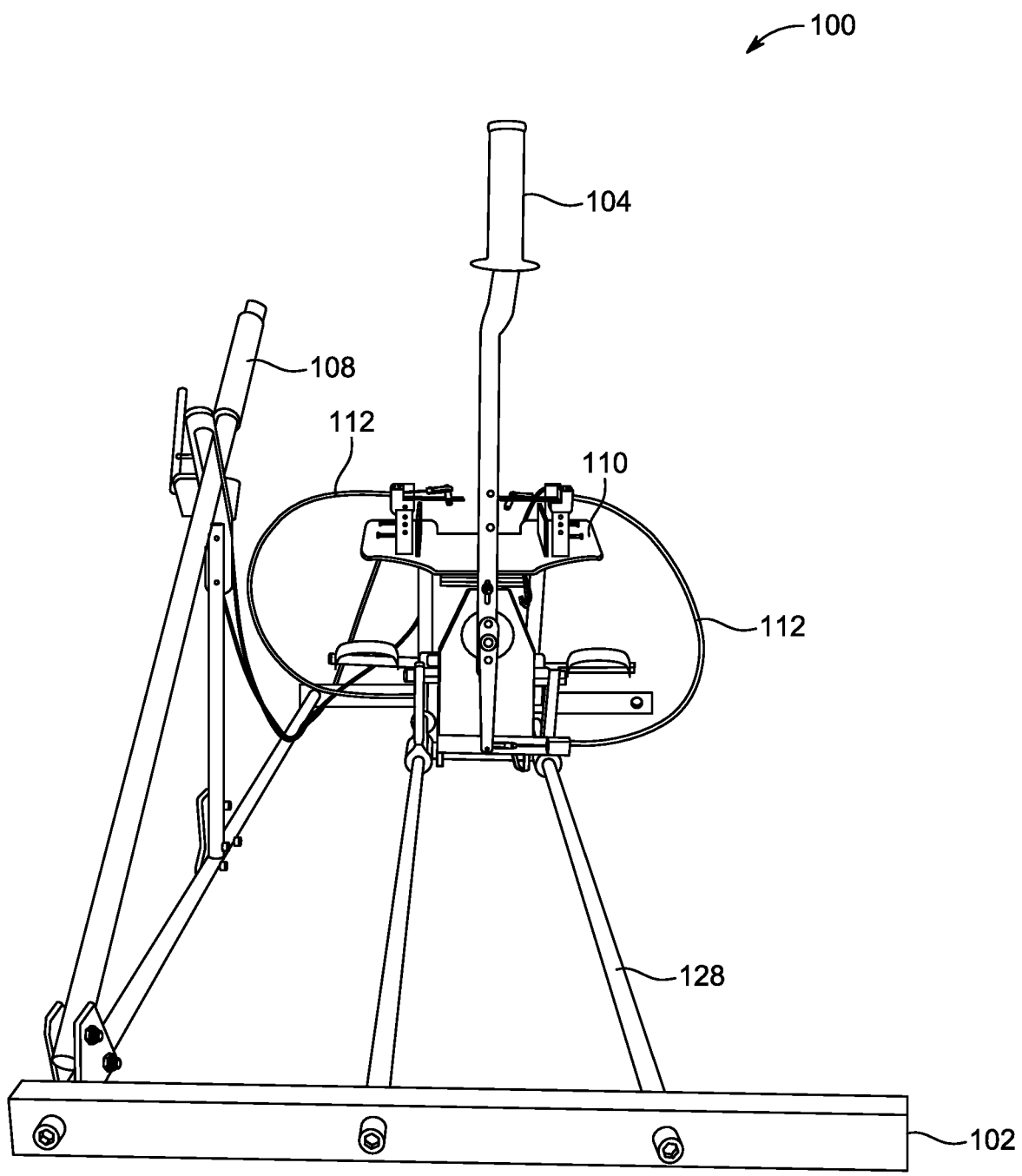
FIG. 3 is a back view of a of an embodiment of the present invention.

FIG. 3 displays a back side view of the system 100. The back side of the system 100 can be designed to provide ample space so that a user can utilize a plurality of seating surfaces. Also as seen in FIG. 3 are rails 128 which allow forward and back adjustments of the system modules 104, 106, 108, 110.

Figure 4:
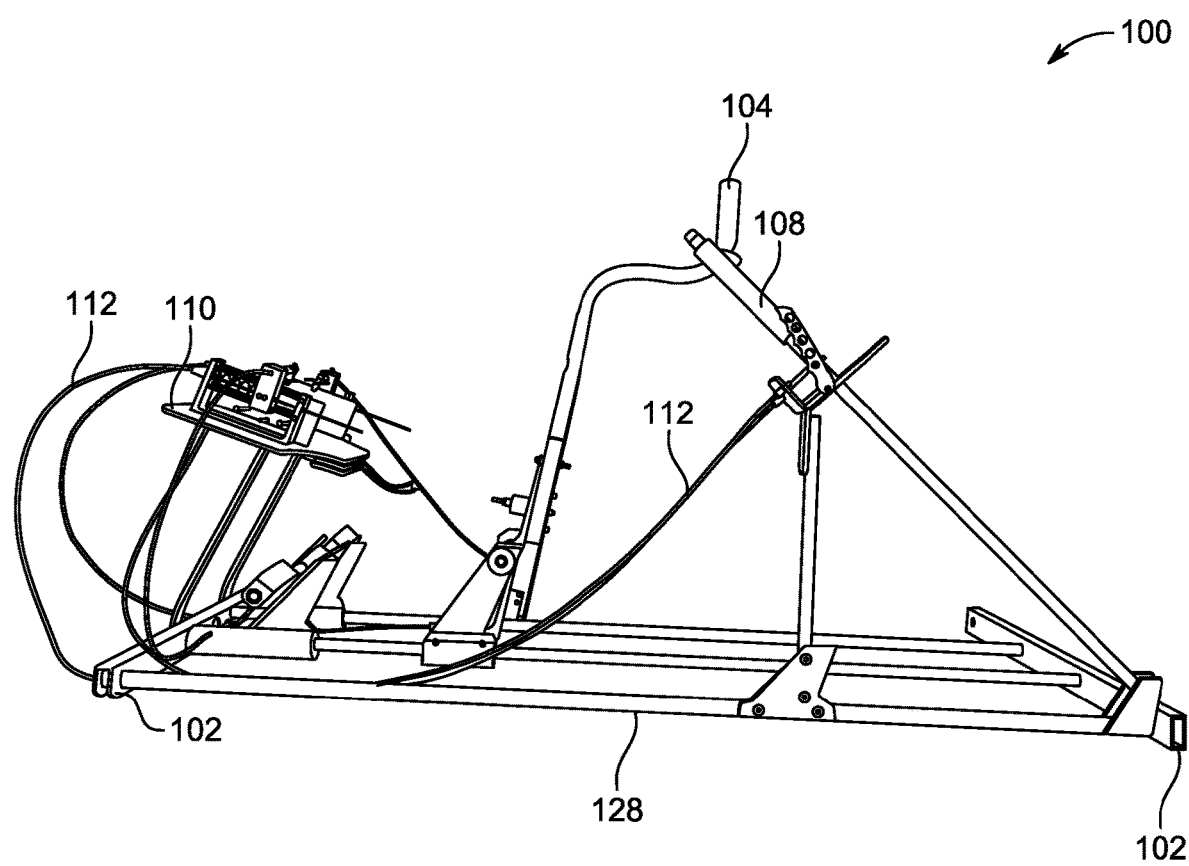
FIG. 4 is a left-hand side view of an embodiment of the present invention.

FIG. 4 shows a left-hand side view of the system 100. Again, the rails 128 as displayed can allow for back and forward adjustments for the modules 104, 106, 108, 110 to accommodate different users.

Figure 5:
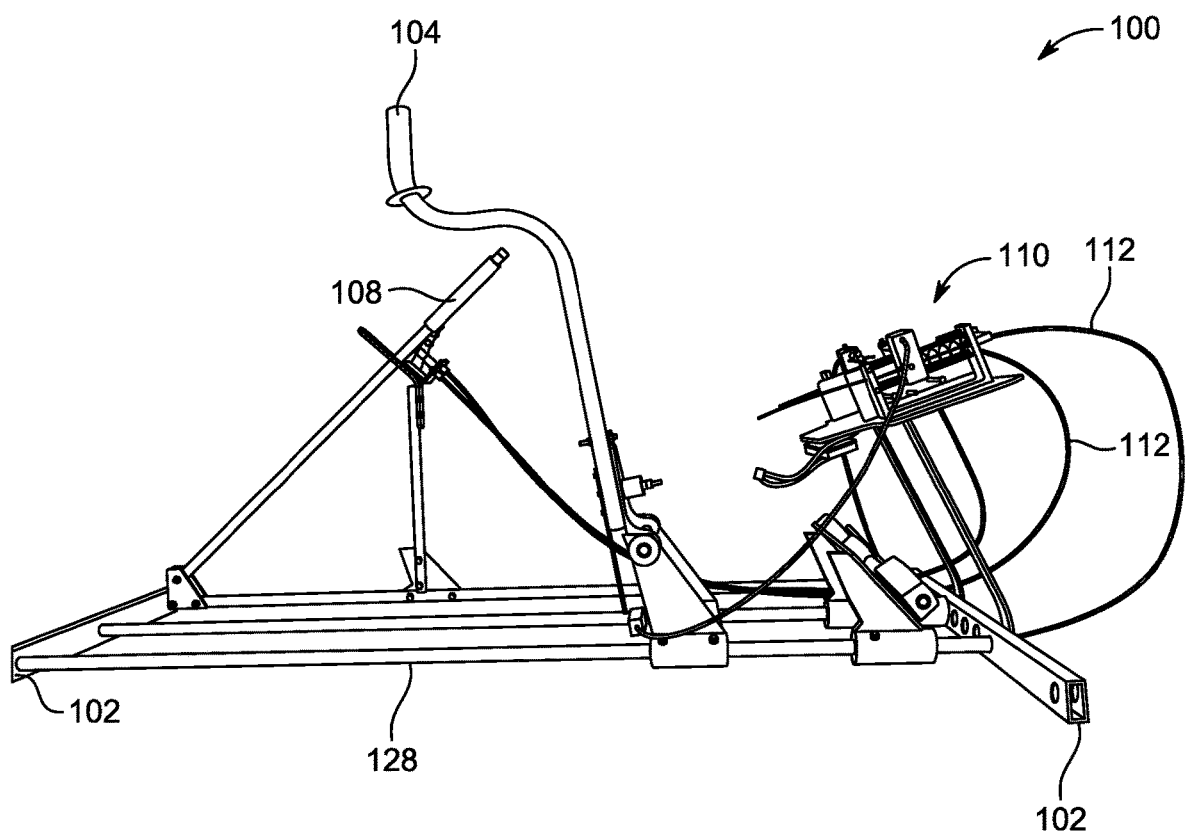
FIG. 5 is a right-hand side view of an embodiment of the present invention.

FIG. 5 presents a right-hand side of the system 100.

Figure 6:
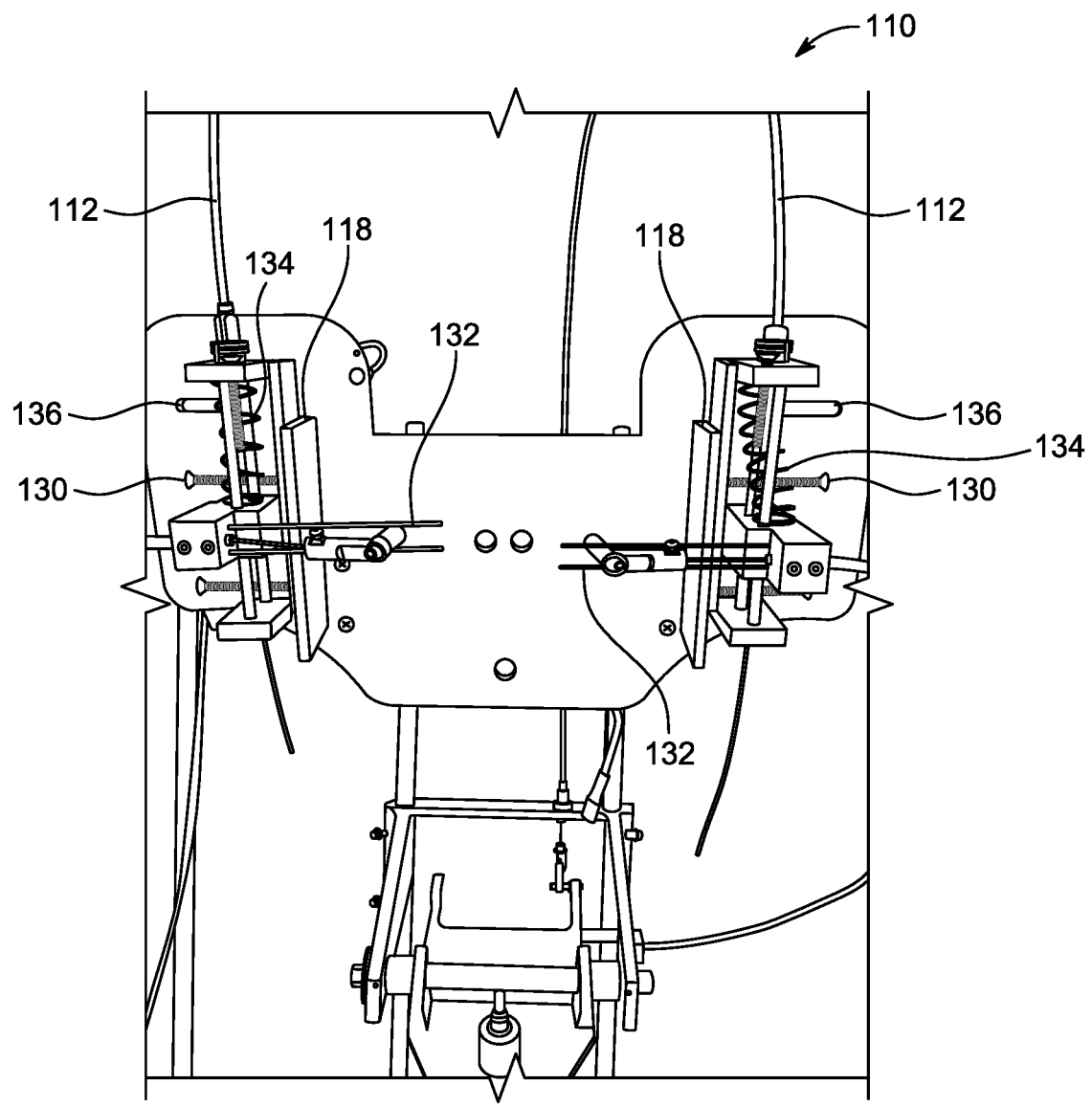
FIG. 6 is a top view of a manipulator module of an embodiment of the present invention.

FIG. 6 is a top view of the manipulator module 110. Additionally, as can be seen, the manipulator module 110 can include mechanical interfaces 122 for the manipulator module 110 to operate right and left-hand aerial R/C transmitter controls. Also seen in FIG. 6, are the top sides of the clamping mechanism 118. The clamping mechanism 118 can include a right side and a left side. Further, the clamping mechanism 118 can include adjustment bolts 130. The bolts 130 can be structured to allow removal of an aerial R/C transmitter 114 and to secure an aerial R/C transmitter 114 to the manipulator module 110.

Further, the manipulator module 110 can include aligning u-bars 132 structured to guide movement of cables 112 interfacing with the controls of the aerial R/C transmitter 114. In embodiments not shown, the manipulator module 110 can include mechanical interfaces 122 to operate auxiliary aerial R/C transmitter 114 controls. These controls can be an on/off switch, remote aircraft camera controls, power control modes of a remote-controlled aircraft.

Additionally, the system 100 can include springs 134 configured to provide tension and control for the cables 112. As seen in FIG. 6, the manipulator module 110 can include slots 136 configured to position the mechanical interfaces 122 and to accommodate aerial R/C transmitters 114 of different sizes.

As best seen in FIG. 6, a top view of an embodiment of the system 100 is presented. A manipulator module 110 is in the forefront with control cables 112 connected to and through sliding manipulator blocks 126. The control cables 112 are seen connecting to cockpit interface devices in the background.

Referencing FIG. 6, control cable 112 guides can be seen connecting to manipulator sliding blocks 126. The control cables 112 as seen connect to right- and left-hand control interfaces 122 of an aerial R/C transmitter 114.

Figure 7:
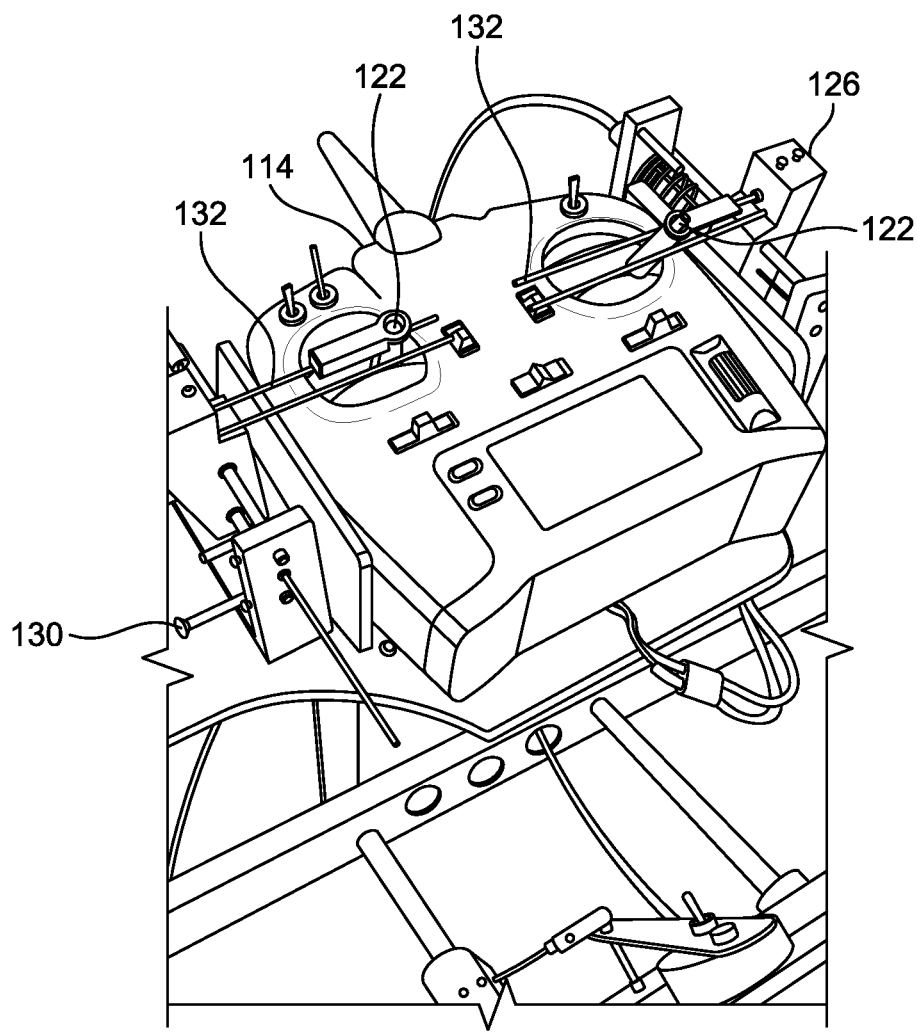
FIG. 7 shows a top perspective view of an aerial R/C transmitter in a manipulator module in an embodiment of the present invention.

FIG. 7 presents a perspective view of manipulator module 110 with an aerial R/C transmitter 114 connected. The aerial R/C transmitter 114 can be held in place with the clamping mechanism 118. As previously discussed, the clamping mechanism 118 can be of a see-saw configuration and can include left hand and right-hand adjustment screws 130. As best seen near the front of the aerial R/C transmitter 114, there may be additional auxiliary control function capabilities on the aerial R/C transmitter 114. In embodiments not shown, the manipulator module 110 can have mechanical interfaces 122 to operate the auxiliary control functions.

Figure 8:
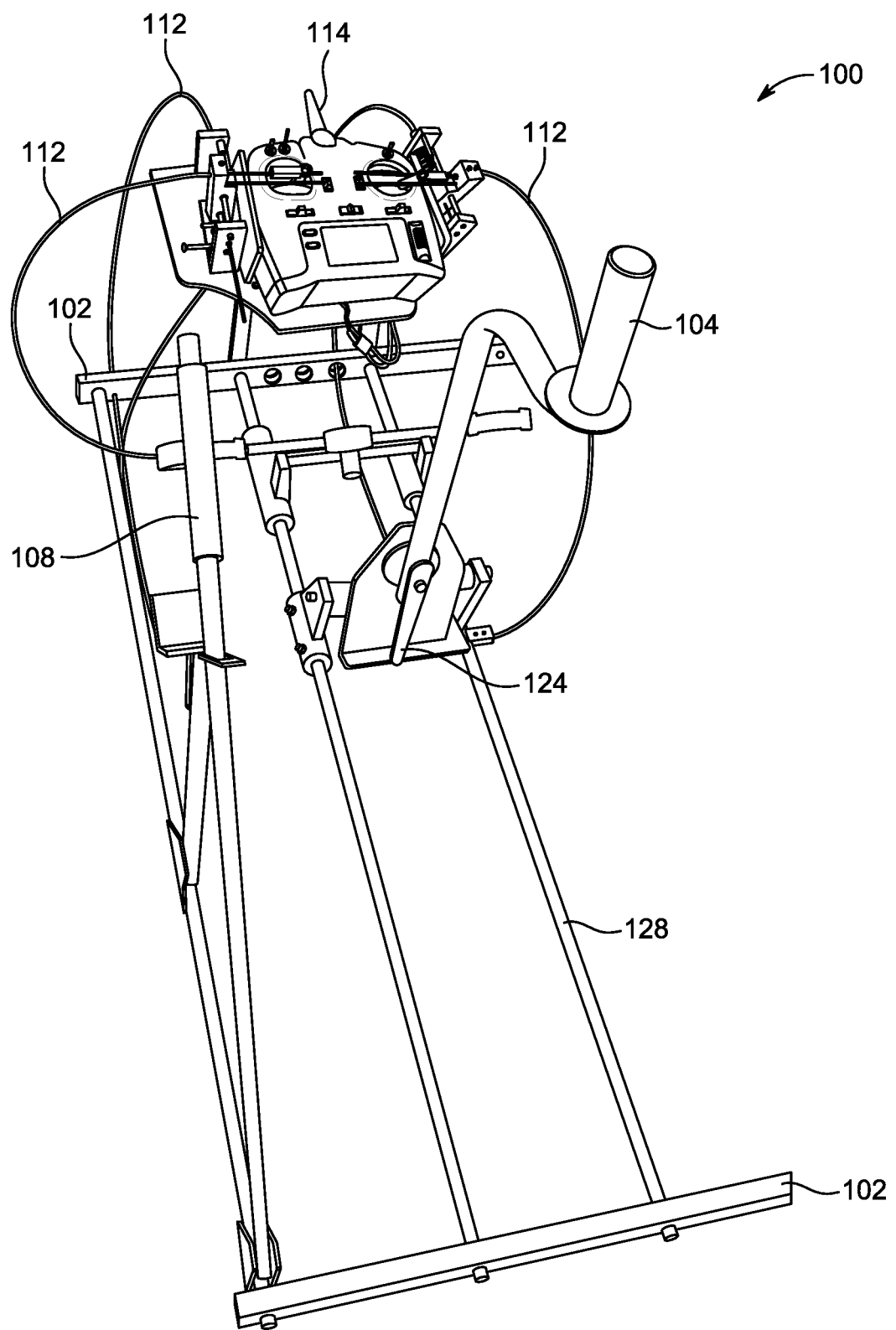
FIG. 8 is a perspective view of a flight stick cockpit simulator ground station system with an aerial R/C transmitter in an embodiment of the present invention.

FIG. 8 displays a top perspective view of a flight stick cockpit simulator ground station system 100 with an aerial R/C transmitter 114 connected.

In embodiments not shown, an embodiment can include helicopter cockpit controls such as but not limited to throttle controls on a left-hand side of the operator's seat, right and left foot pedals configured for yaw control, and/or a yoke stick configured for pitch and roll.

In embodiments not shown, additional cockpit control interfaces can be configured to interact with the aerial R/C transmitter to direct and manipulate further flight controls. In embodiments not shown, an operator can utilize cameras on a remote-control aircraft and receive visual data by wearing goggles.

In embodiments not shown, manipulator slide blocks provide a connection point for control cable sheaths and/or housings throughout the system and are incorporated into the system modules. The control cables travel through and are secured in the bored section in the blocks by drop screws to manipulate controls on the remote controller. The housing for the manipulator module and the manipulator slide blocks can include aluminum, composites, synthetic materials, and are arranged to provide rigidity for the system in order to enhance precision control. The sliding blocks move on sliding block rods and/or pins configured to allow low friction movement of system components. The system can include sliding block rods and/or pins. Further, the system can include springs to allow for tensioning and control of system components.

In embodiments not shown, video cameras and digital cameras can communicate with an operator with goggles. The cameras can be placed on flying aircraft to enhance an operator's experience of cockpit simulation by placing the operator's visual reference in an on-board camera and thereby improve an operator's ability to control a flying aircraft. In embodiments not shown the system can include one or a plurality of computers and/or data processors.

In embodiments, the system can include system components which can include sections wherein the sections can be put together to form the system and wherein the sections can be detached to allow collapsing of the system components to provide for ease of portability.

In some embodiments, the method or methods described above may be executed or carried out by a computing system including a tangible computer-readable storage medium, also described herein as a storage machine, that holds machine-readable instructions executable by a logic machine (i.e. a processor or programmable control device) to provide, implement, perform, and/or enact the above described methods, processes and/or tasks. When such methods and processes are implemented, the state of the storage machine may be changed to hold different data. For example, the storage machine may include memory devices such as various hard disk drives, CD, flash drives, cloud storage, or DVD devices. The logic machine may execute machine-readable instructions via one or more physical information and/or logic processing devices. For example, the logic machine may be configured to execute instructions to perform tasks for a computer program. The logic machine may include one or more processors to execute the machine-readable instructions. The computing system may include a display subsystem to display a graphical user interface (GUI) or any visual element of the methods or processes described above. For example, the display subsystem, storage machine, and logic machine may be integrated such that the above method may be executed while visual elements of the disclosed system and/or method are displayed on a display screen for user consumption. The computing system may include an input subsystem that receives user input. The input subsystem may be configured to connect to and receive input from devices such as a mouse, keyboard or gaming controller. For example, a user input may indicate a request that certain task is to be executed by the computing system, such as requesting the computing system to display any of the above described information or requesting that the user input updates or modifies existing stored information for processing. A communication subsystem may allow the methods described above to be executed or provided over a computer network. For example, the communication subsystem may be configured to enable the computing system to communicate with a plurality of personal computing devices. The communication subsystem may include wired and/or wireless communication devices to facilitate networked communication. The described methods or processes may be executed, provided, or implemented for a user or one or more computing devices via a computer-program product such as via an application programming interface (API).

Since many modifications, variations, and changes in detail can be made to the described preferred embodiments of the invention, it is intended that all matters in the foregoing description and shown in the accompanying drawings be interpreted as illustrative and not in a limiting sense. Furthermore, it is understood that any of the features presented in the embodiments may be integrated into any of the other embodiments unless explicitly stated otherwise. The scope of the invention should be determined by the appended claims and their legal equivalents.

The present invention has been described with reference to the preferred embodiments, it should be noted and understood that various modifications and variations can be crafted by those skilled in the art without departing from the scope and spirit of the invention. Accordingly, the foregoing disclosure should be interpreted as illustrative only and is not to be interpreted in a limiting sense. Further it is intended that any other embodiments of the present invention that result from any changes in application or method of use or operation, method of manufacture, shape, size, or materials which are not specified within the detailed written description or illustrations contained herein are considered within the scope of the present invention.

What is claimed is:

1. A flight stick cockpit simulator ground station system comprising:
    a base;
    a yoke control module connected to the base;
    a yaw control module connected to the base;
    a throttle control module connected to the base; and
    a manipulator module for an aerial R/C transmitter for remote controlled aircraft connected to the base and configured to receive inputs from the yoke control module, the yaw control module, and the throttle control module and structured to mechanically control the aerial R/C transmitter without the need for electrical or computerized mechanisms;
    wherein the manipulator module further comprises a clamping mechanism including adjustment bolts structured to allow removal of the R/C transmitter.

2. The system of claim 1 wherein the yaw control module functions to control yaw with a see-saw configuration allowing a user of the system to provide resistance in controlling the yaw by resistance of opposing right and left foot pedals without the need for springs, dashpots, or computer assisted interface.

3. The system of claim 1 wherein structural components of the system are constructed of metal.

4. The system of claim 1 wherein the ground station system is collapsible and is configured to be placed within a travel container and designed to allow portability of the system in common commercial aircraft and a car.

5. The system of claim 1 wherein the system is configured to interface with a plurality of system user seating surfaces.

6. The system of claim 1 wherein the manipulator module for an aerial R/C transmitter is adjustable and configured to connect with a plurality of different shapes and models of aerial R/C transmitters.

7. The system of claim 1 wherein the manipulator module for an aerial R/C transmitter is configured to connect to and manipulate left and right-hand control interfaces of the aerial R/C transmitter.

8. The system of claim 1 wherein the throttle control module, the yoke control module and the yaw control module are adjustable with respect to position on the system.

9. The system of claim 1 wherein the manipulator module for the aerial R/C transmitter is configured to rigidly hold the aerial R/C transmitter in position.

10. The system of claim 1 wherein the system includes rigidly connected system control components configured to provide sensitive precise system response to system user control inputs.

11. The system of claim 1 wherein adjustment points of the system are uniform and configured to be adjusted utilizing a same tool.

12. The system of claim 1 wherein the yaw control module includes round pedals configured to roll under a system user's right and left feet.

13. The system of claim 1 wherein the manipulator module is configured to operate auxiliary functions on the aerial R/C transmitter.

* * * * *